United States Patent [19]

Porter et al.

[11] Patent Number: 4,549,998
[45] Date of Patent: Oct. 29, 1985

[54] CONTACTING DEVICE

[75] Inventors: John E. Porter, Newcastle upon Tyne; Colin Ramshaw, Norley, both of England

[73] Assignee: Imperial Chemical Industries PLC, Hertfordshire, England

[21] Appl. No.: 701,446

[22] Filed: Feb. 13, 1985

Related U.S. Application Data

[63] Continuation of Ser. No. 444,336, Nov. 24, 1982, abandoned.

[30] Foreign Application Priority Data

Nov. 24, 1981 [GB] United Kingdom ............... 8135407

[51] Int. Cl.$^4$ .............................................. B01F 3/04
[52] U.S. Cl. ..................................................... 261/88
[58] Field of Search ............................ 261/88, 89, 90

[56]     References Cited
         U.S. PATENT DOCUMENTS

| | | | |
|---|---|---|---|
| 2,220,657 | 11/1940 | Placek | 261/90 |
| 2,342,469 | 2/1944 | Holm-Hanson | 261/89 |
| 2,601,519 | 6/1952 | Hardy et al. | 261/90 |
| 2,809,817 | 10/1957 | Munters | 261/88 |
| 2,941,872 | 6/1960 | Pilo et al. | 261/89 |
| 3,095,149 | 6/1963 | Peebles | 261/89 |
| 3,544,084 | 12/1970 | Macrow | 261/90 |
| 4,397,795 | 8/1983 | Jackson | 261/89 |

FOREIGN PATENT DOCUMENTS

| | | | |
|---|---|---|---|
| 977673 | 11/1975 | Canada | 261/88 |
| 808114 | 7/1951 | Fed. Rep. of Germany . | |
| 2308440 | 8/1974 | Fed. Rep. of Germany | 261/90 |
| 2408753 | 4/1975 | Fed. Rep. of Germany . | |
| 347303 | 4/1931 | United Kingdom | 261/90 |
| 757149 | 9/1956 | United Kingdom . | |

Primary Examiner—Tim Miles
Attorney, Agent, or Firm—Cushman, Darby & Cushman

[57]     ABSTRACT

In a centrifugal device for contacting a liquid with a gas or with a second liquid, high rates of mass transfer are achieved by carrying out the contacting on a rotating plate whose surface is capable of creating perturbations in liquid flowing across it.

6 Claims, 7 Drawing Figures

CONTACTING DEVICE

This is a continuation of application Ser. No. 444,336, filed Nov. 24, 1982, now abandoned.

THIS INVENTION is concerned with centrifugal liquid-liquid and gas-liquid contacting devices.

Various centrifugal devices for contacting a first liquid with a second liquid or gas have been proposed, including that described in UK Patent Specification No. 757,149. The device described in UK Patent Specification No. 757,149 comprises a rotor in which are disposed filler bodies or plates, over the surface of which filler bodies or plates the first liquid and/or the second liquid or gas flows under centrifugal force.

We have now found, where one or more plates is or are mounted substantially transversely to the aforesaid axis, that the use of one or more plates which is or are capable of creating perturbations in the film of liquid flowing thereover gives an improvement in mass transfer between the first liquid and the second liquid or gas.

Accordingly, the present invention provides a centrifugal device for contacting a first liquid with a gas or a second liquid, which device comprises a rotor having one or more plates mounted transversely to the axis of rotation of the rotor, means to charge the first liquid to a radially inner part of the rotor, means to charge the gas or second liquid to the rotor and means to collect liquid discharged from the rotor, characterised in that a surface of at least one plate is capable of creating perturbations in any liquid flowing across it.

The flow of the gas or second liquid through the rotor in a device of the present invention may be co-current with or counter current to the flow of the first liquid although counter current flow is often preferred. Where counter-current flow is employed in the present invention it will be appreciated that the density of the gas or second liquid is less than the density of the first liquid.

As examples of perturbations which may be created in the first liquid in a device of the present invention we would mention (a) formation of a spray of fine droplets of the first liquid which is ejected from the surface of a plate and (b) continuous or periodic renewal of the surface of the thin film as it flows across the surface of a plate while remaining in contact therewith over substantially all of the surface of the plate. The aforesaid contact may be maintained, for example, by adapting the plate such that under appropriate conditions the "Coanda" effect may be utilised to retain the first liquid on the plate until it reaches the outer perimeter of the plate.

The plate surface capable of creating perturbations in any liquid flowing across it may take a variety of forms in order to give that effect. Thus the plate may have protrusions from the surface or indentations in the surface or the plate may be corrugated, porous or perforated. These features designed to create perturbations are preferably disposed substantially transversely to the flow of the first liquid across the plate surface. More preferably, they are disposed in one or more circles which are concentric with the axis of rotation of the rotor.

Thus in one form, where the surface features are one or more channels in the plate surface, it is preferred that they are continuous channels disposed concentrically about the axis of rotation of the rotor. Such channels are preferably substantially V-shaped and in particular the radially outer surface of the V-shaped channel is preferably steeper than the radially inner surface thereof. More preferably the upper portion, at least, of the radially outer surface presents a continuously decreasing gradient to the first liquid as it emerges from the channel; such a decreasing gradient affords retention of the first liquid on the surface of the plate at higher rotational speeds.

In another form of the device according to the present invention, the plate of which the surface is capable of creating perturbations in any liquid flowing across it is porous—or at least a portion of that plate is porous. Use of such a porous plate has the advantage that a first liquid which is fed to the first surface of the plate, permeates through the plate to appear on the second surface thereof and is thus exposed to the second liquid or gas on both surfaces of the plate. Thus the porous plate may be inter alia foraminate, cribriform or gauze-like. It is particularly preferred that the plate, or at least a part of it, be perforated. The perforations are preferably disposed symmetrically about the axis of rotation of the rotor, for example in one or more circles disposed concentrically about the axis of rotation. The perforations may be of uniform size throughout the perforated area of the disc or may vary; for example, the size of the perforations may vary with distance from the axis of rotation.

Whilst it is often preferred that the thin porous plate is rigid, for example it is made of metal or plastic, we do not exclude the possibility that it may not be self-supporting and may become plate-like only when rotated at a sufficiently high speed. For example, it may be made from a woven, knitted or so-called nonwoven fabric.

When the surface features creating perturbations, for example corrugations, protrusions, indentations or perforations, are disposed in concentric circles, the circles are preferably spaced at a density, measured in a radial direction, of between 50 and 1,000 per meter, preferably more than about 100 per meter. Thus the pitch of the pattern of these surface features, that is the distance between repeated features of the pattern, is preferably between 1 mm and 20 mms, more preferably less than about 10 mms. When the surface features creating perturbations are channels, the depth of each channel is preferably between 0.05 and 5 mms, especially between 0.2 and 5 mms and more especially between 0.5 and 2.5 mms. Very shallow channels, for example of the order of 0.05 to 0.25 mm, may if desired be formed by etching the plate surface.

The thickness of the plate or plates employed in the device according to the present invention is generally between 0.05 and 5 mms, depending upon the material of construction, the specific contacting duty to be carried out and the form of surface features chosen. While the thickness of the plate may vary—and obviously will vary with some forms of surface features—in general when referring to plate thickness we refer to the plate thickness as it would be without those features. The plate thickness is preferably between 0.25 and 1.5 mms, especially between 0.5 and 1.0 mm.

The outer diameter of the one or more plates used in a device of the present invention is typically in the range 25 cm to 5 meters and is preferably about 1 meter and where the one or more plates is in the form of an annulus the inner diameter thereof is typically in the range 5 cm to 1 meter.

The material of construction of the one or more plates used in a device of the invention should be such that the or each plate can withstand the stress generated in the material during use. Preferably the material is substantially resistant to attack by or reaction with the material with which it may be in physical contact. Typically, the material from which the plates are formed is a glass, ceramic or preferably a metal, more preferably a chemically resistant metal, e.g. stainless steel, nickel or titanium. It is often desirable to give the plates an appropriate surface treatment, which may be chemical, e.g. etching, or physical, e.g. sand-blasting, to provide surfaces which are wetted by the liquid.

Where a device of the present invention comprises a plurality of plates, they are disposed along the axis closely adjacent to one another to form narrow passages and preferably the mean axial depth of the passageways between adjacent plates is less than about 50 mms and more preferably is between 0.2 and 5 mms. Where the axial depth of a passageway varies along the radial length thereof, for example both of the two opposing surfaces which define the passageway have peaks and troughs, the troughs of the first of the said surfaces being aligned with the troughs of the second of the said surfaces and the peaks of the first surface being aligned with the peaks of the second surface, the narrowest gap is often about 2 mm and the largest gap is often about 8 mm.

Where the device of the present invention comprises a plurality of plates it is often preferred that they are so arranged and/or shaped that the axial depth of each passageway between adjacent plates is not constant. In particular, it may be preferred that the surface contours of one plate "engage" the contours of the opposed surface of an adjacent plate in the sense that protrusions on one surface are aligned with protrusions on the surface opposed thereto. By this means a fresh spray of the first liquid can be continuously formed since as the first liquid flows through the passageway between two plates, the opposed surfaces of which have a multiplicity of contours, it is ejected from a protruding contour of one plate, deposited on a contour on the opposed surface of the adjacent plate, from a protruding contour of which it is rapidly ejected and this ejection alternates between the protruding contours of the two opposed surfaces as the first liquid flows along the passageway therebetween.

Means to charge the first liquid to the one or more plates is conveniently a stationary liquid feed pipe provided with suitable orifices and arranged co-axially with the rotating one or more plates.

Where counter-current flow is employed in the present invention, means to charge the gas or second liquid to the one or more plates is provided adjacent the outer perimeter of the plates. Conveniently the one or more plates are mounted in a stationary housing into which the gas or second liquid is fed at a pressure sufficiently high to overcome the pressure of the liquid discharged from the perimeter of the one or more plates.

The first liquid or a portion or derivative thereof is conveniently collected in a stationary housing in which the one or more plates are mounted and from which it can be withdrawn when desired.

The mean acceleration to which the first liquid is subjected in a centrifugal device of the present invention is more than 10 meters/second$^2$, preferably more than 100 meters/second$^2$ and more preferably more than 1,000 meters/second$^2$. Generally, as the mean acceleration is increased the rate of mass transfer between the first liquid and the gas or second liquid is increased. However, it will be appreciated that for plates of a certain diameter, loaded at a certain liquid flow rate, the power requirements of the apparatus in which the plates are mounted is proportional to the square of the speed of rotation of the plates. Thus the optimum speed at which the plates are rotated often represents a commercial balance between the desirability of a high mean acceleration and a low power requirement.

Mean acceleration $a_m$ is defined by the equation $$a_m = \left(2\pi \frac{N}{60}\right)^2 \left(\frac{r_0^2 + r_1^2}{2}\right)^{\frac{1}{2}}$$

where N is the rotational speed of the one or more plates about the axis of rotation thereof in revolutions per minute, $r_o$ is the distance in meters from the aforementioned axis to the radially inner edge or edges of the one or more plates and $r_1$ is the distance in meters from the aforementioned axis to the radially outer edge of the one or more plates. It will be appreciated that where a plate is in the form of a disc, $r_o$, in the calculation of the mean acceleration to which a liquid flowing thereover is subjected, is zero.

The rate of flow of liquid across the surface of a plate is typically in the range $10^{-5}$ to $10^{-2}$ meters$^3$/second/meter of plate perimeter.

Devices according to the present invention may be employed in inter alia absorption, desorption, counter-current extraction, distillation and homogenisation processes.

The present invention will now be further illustrated by reference to the accompanying drawings which show, by way of example only, one embodiment of the present invention. In the drawings.

Figure 1:
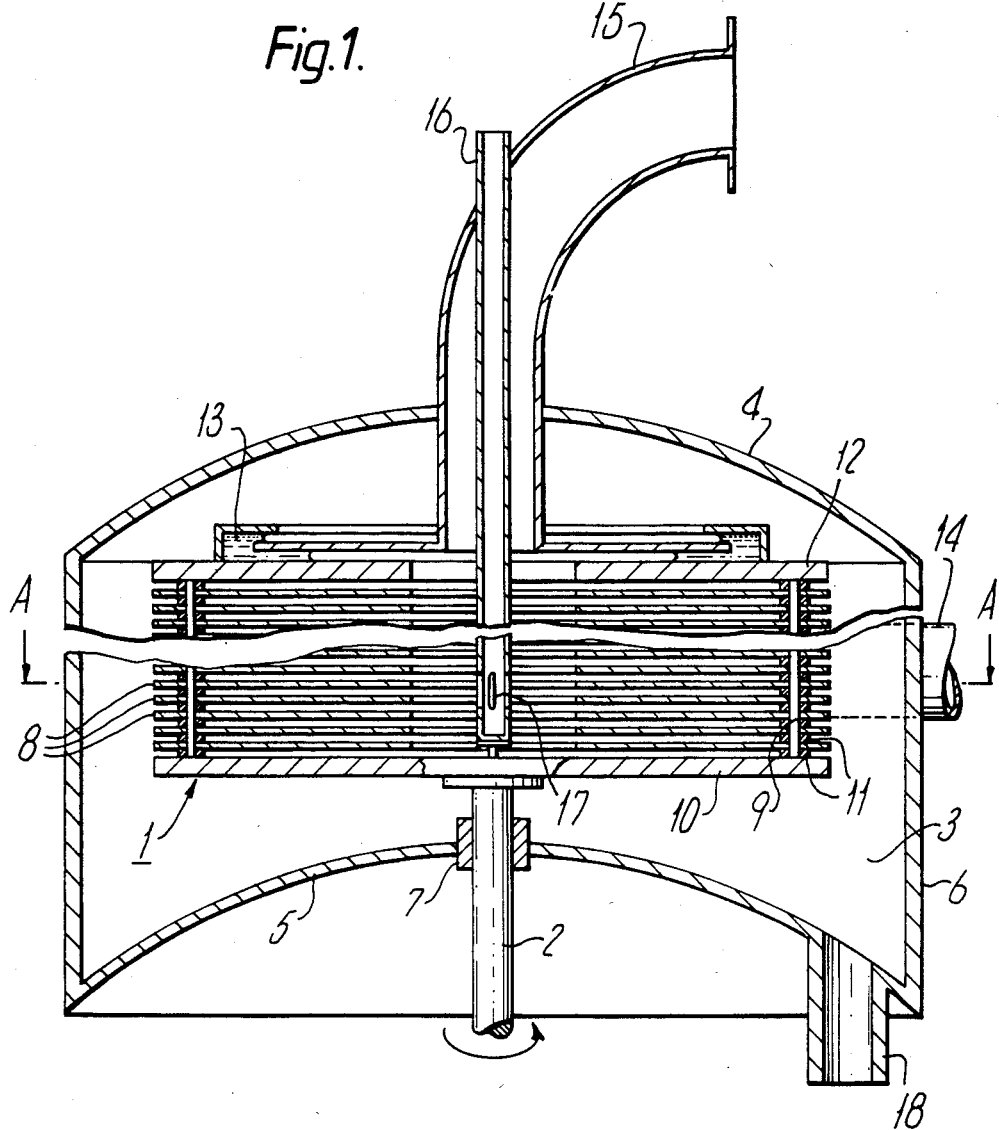
FIG. 1 is a vertical sectional view of a gas-liquid contacting device according to the present invention.
Figure 2:
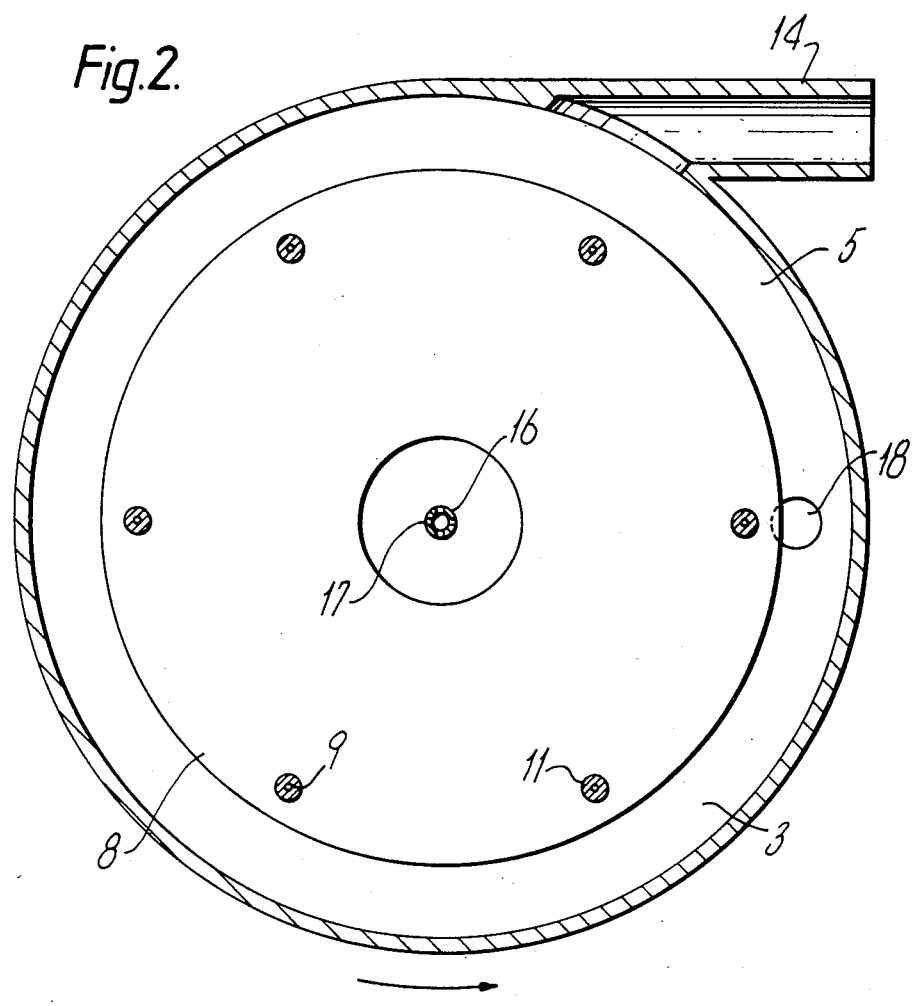
FIG. 2 is a horizontal sectional view on the line AA of FIG. 1.
Figure 3:
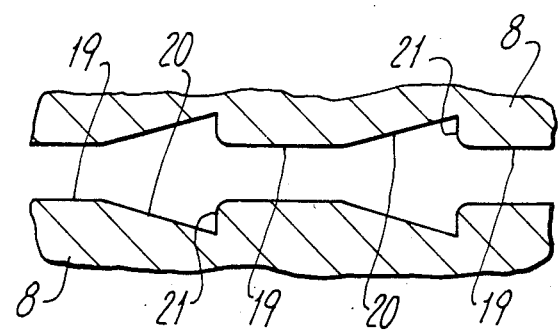
FIG. 3 is a detail, on an enlarged scale, of two opposing surfaces of the plates of FIGS. 1 and 2.

In FIGS. 1 to 3 of the drawings, a rotor, designated generally by the numeral 1, is mounted upon a drive shaft 2, by means of which it is rotated within a chamber 3 defined by cover 4, base 5 and a cylindrical sidewall 6. Where the shaft 2 passes through the base 5 a conventional mechanical seal 7 is provided. Rotor 1 comprises a plurality of thin annular plates 8, mounted on six pins 9 on the base 10 of the rotor and spaced apart by washers 11, and a cover plate 12 which is provided with a liquid seal 13. The chamber 3 is provided with a gas feed-tube 14, a gas discharge tube 15, liquid feed-pipe 16 which has apertures 17 in its lower end and liquid discharge port 18.

In operation of the illustrated device, the rotor 1 is rotated; a liquid is fed via feed-pipe 16 and the apertures 17 to the stack of annular plates 8 and it moves radially outwards across the surfaces thereof as a thin film. The thin film flows across the horizontal surfaces 19, down the sloping surfaces 20, at the bottom of which it is thoroughly mixed, up the vertical surfaces 21 and, because of the chamfered edge where surfaces 19 and 21 join, is retained on the surface by the Coanda effect to continue its radially outward flow. The liquid is ejected from the outer perimeter of the plates into chamber 3 from where it runs off through discharge port 18. A gas is fed into the device through the gas-feed tube 14, it enters the passageways between the annular plates 8 and moves radially inwards to leave the passageways at the inner edge of the plates. The portion of the gas which is not absorbed by the liquid is discharged through tube 15.

Various aspects of the present invention will now be described by reference to the following Examples, which are illustrative of the invention.

EXAMPLE 1

Water, at flow rates of 300 to 950 mls/second, was charged adjacent the axis of rotation to a plain disc of 600 mms diameter, rotating at 100 rpm in an atmosphere of nitrogen. The concentration of oxygen in the water feed was 8.15 ppm and the concentration in the water at the disc perimeter was measured; from the measured concentrations, the rates of oxygen transfer from the water to the nitrogen from the axis of the disc to its perimeter were calculated. The results are expressed graphically as Curve A in FIG. 4.

The exercise was repeated using a grooved disc, of 600 mms diameter, having a profile corresponding to one of the discs shown in FIG. 3. The groove depth was 2 mms and the pitch 5 mms. The results are shown as Curve B in FIG. 4.

The exercise was again repeated, this time using a perforated disc of 600 mms diameter. The perforations were in the form of 1.5 mm holes punched in a triangular pitch such that the hole area amounted to about 30 percent of the disc surface area. The results are shown as Curve C in FIG. 4.

Figure 4:
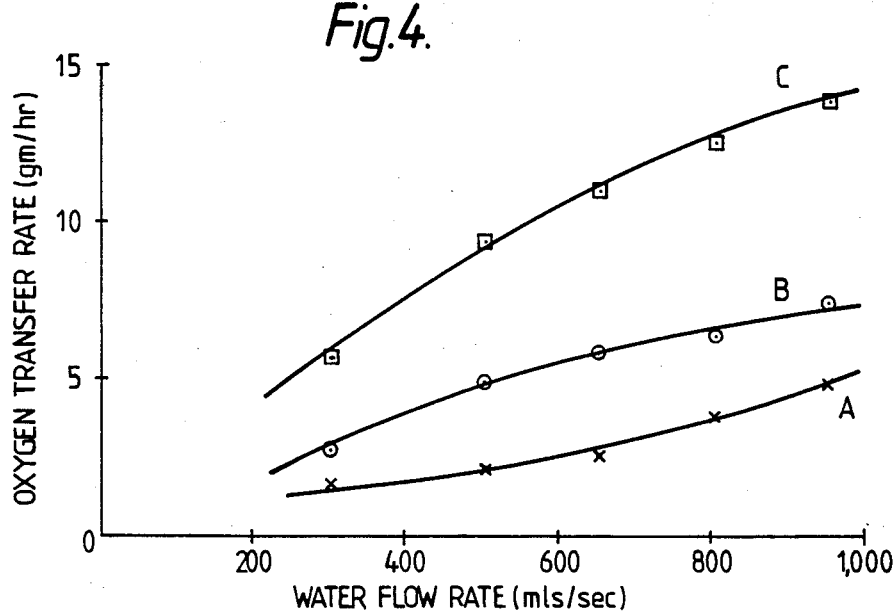
FIGS. 4 to 7 illustrate improved oxygen transfer rates which can be obtained with a centrifugal device of the present invention.

As is clearly seen from FIG. 4, the rate of transfer of oxygen from the water is greater on the grooved disc than on the plain disc and is much greater still using the perforated disc.

EXAMPLE 2

Figure 5:
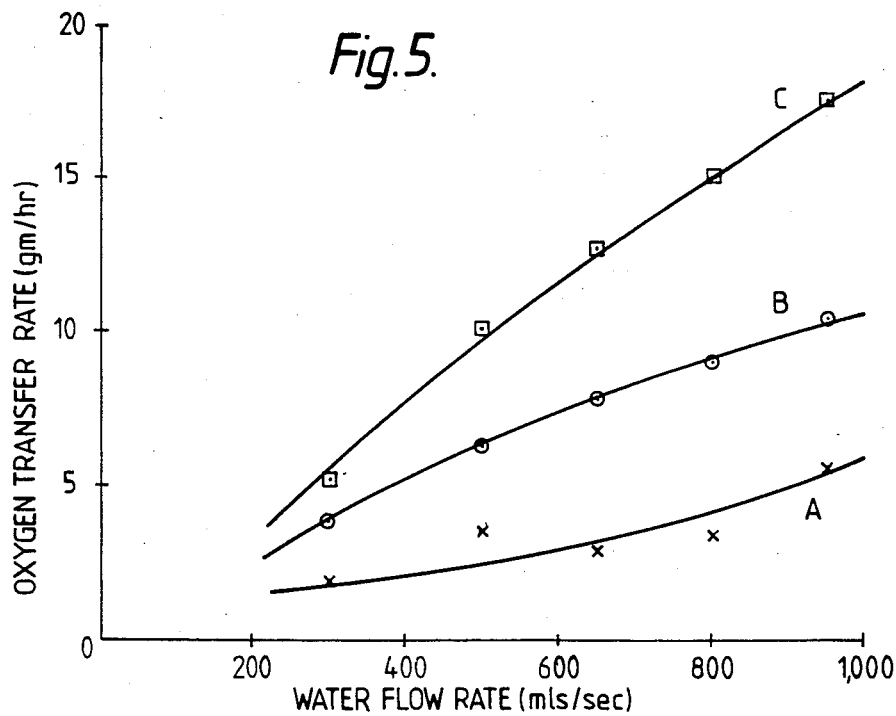

Example 1 was repeated using the same three discs and the same conditions throughout, except that the discs were rotated at 200 rpm. As shown in FIG. 5, enhanced results were obtained with all three discs and again the two discs having surfaces designed to create perturbations in the liquid flow gave markedly better results than the plain disc. (Curve lettering is as before).

EXAMPLE 3

Figure 6:
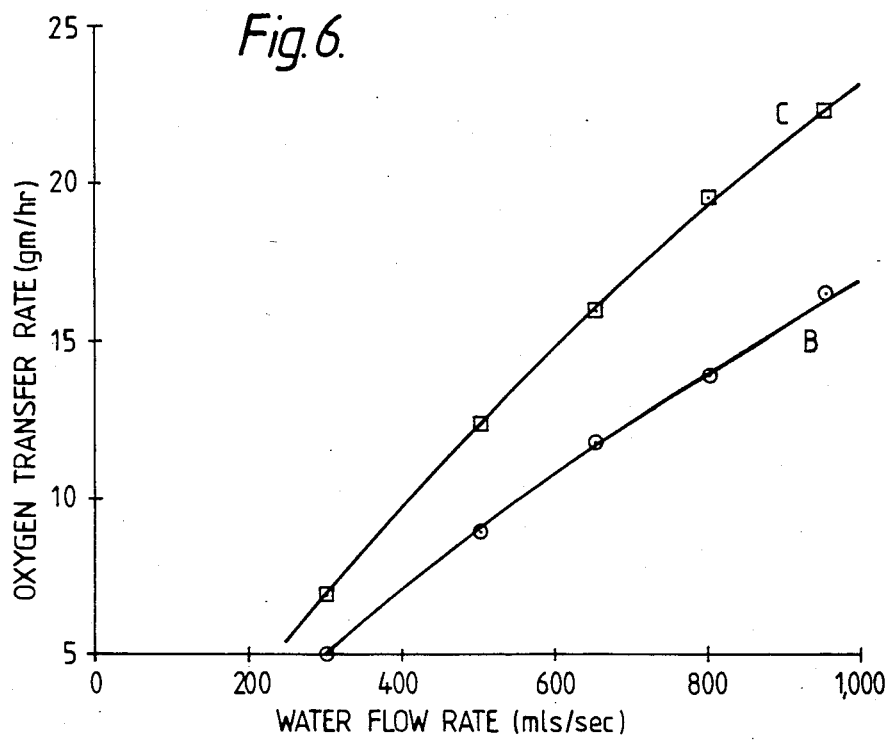

The procedure of the previous two Examples was repeated, using this time only the grooved and the perforated discs and rotating the discs at 400 rpm. FIG. 6, in which Curve B is for the grooved disc and Curve C for the perforated disc, again shows the high oxygen transfer rates obtainable.

EXAMPLE 4

A further oxygen transfer Example was carried out, using the procedure of the previous Examples but this time using "twinned" discs, rotated at 700 rpm.

In a first experiment, the discs were two 600 mm diameter discs; the opposed surfaces of the discs had profiles corresponding to those shown in FIG. 3 in which the depth of the grooves was 2 mms and the pitch of the grooves was 5 mms. The discs were mounted with the parallel portions of the facing surfaces spaced 2 mms apart. Nitrogen was charged to the space between the discs, cocurrently with the water, at a rate of 375 mls/second. The calculated oxygen transfer rate is shown as Curve B in FIG. 7.

Figure 7:
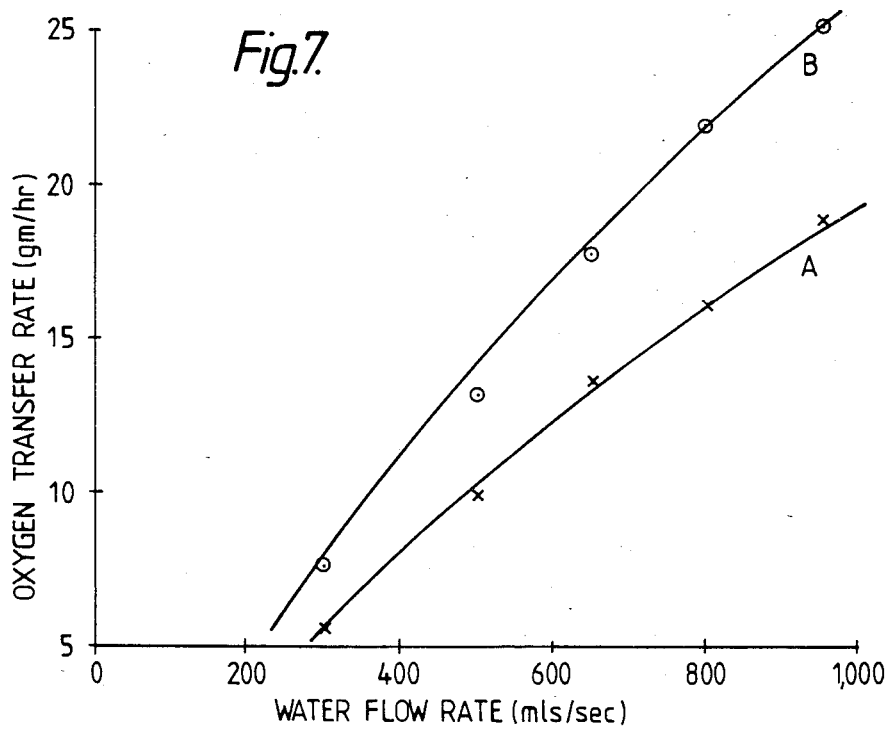

Results obtained with a pair of plain 600 mm discs, also spaced 2 mms apart, are included for comparison as Curve A of FIG. 7.

We claim:

1. In a centrifugal device for contacting a first liquid with a gas or a second liquid comprising: a rotor having a plurality of plates mounted transversely to and coaxially with the axis of rotation of said rotor and being spaced apart along said axis, at least one surface of each of said plates being capable of creating perturbations in any liquid flowing across it; means to charge said first liquid to a radially inner part of said rotor; means to charge said gas or second liquid to said rotor; and means to collect liquid discharged from said rotor, the improvement wherein the said plates are spaced apart by a distance of 0.2 to 5 mm along said axis and wherein at least a portion of said perturbations are caused by a plurality of continuous substantially V-shaped channels in said surfaces, the radially outer surface of each of said channels being steeper than the radially inner surface thereof.

2. The centrifugal device of claim 1, having drive means able to rotate said plate at a speed sufficient to subject any liquid flowing across it to a mean acceleration of more than 10 meters/second$^2$.

3. The centrifugal device of claim 2, wherein said plate capable of creating perturbations is porous.

4. The centrifugal device of claim 2, wherein said plate capable of creating perturbations is perforated.

5. The centrifugal device of claim 1, wherein:
said radially outer surface of said channels is of continuously decreasing gradient away from said axis of rotation of said rotor.

6. The centrifugal device of claim 5, wherein the pitch of said plurality of channels is between 1 mm and 20 mms.

* * * * *